(No Model.)
J. HIMES.
BEARING.
No. 580,693.　　　　　　　Patented Apr. 13, 1897.
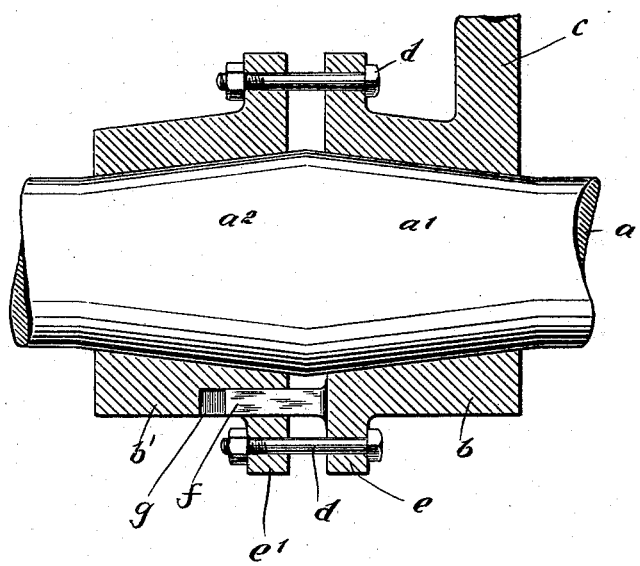
WITNESSES:
Henry T. Hirsch.
Isaac B. Wentz.
INVENTOR
J. Himes.
BY
　　　　ATTORNEYS.

UNITED STATES PATENT OFFICE.

JOSEPH HIMES, OF PORT BLAKELY, WASHINGTON.

BEARING.

SPECIFICATION forming part of Letters Patent No. 580,693, dated April 13, 1897.

Application filed December 26, 1896. Serial No. 617,043. (No model.)

*To all whom it may concern:*

Be it known that I, JOSEPH HIMES, of Port Blakely, in the county of Kitsap and State of Washington, have invented a new and Improved Bearing, of which the following is a full, clear, and exact description.

The object of this invention is to provide a bearing which prevents longitudinal or sliding movement of a shaft and at the same time allows it to freely turn. In attaining this end I provide two sections, the bores of which are frusto-conical in form and receive a shaft having a double-cone formation, whereby the shaft is allowed to turn, but is prevented from movement longitudinally. One of the sections of the bearing is provided with an arm and the other section with a recess, in which latter the arm is received, so that the two sections are prevented from independent movement around the shaft.

The invention will be fully described hereinafter and defined in the claims.

The drawing represents a longitudinal section of a bearing embodying my invention.

The shaft $a$ is enlarged, as shown, to form a double-cone frustum, the members $a'$ and $a^2$ of which are received within the correspondingly-bored bearing-sections $b$ and $b'$.

The section $b$ has an arm or bracket $c$, by which the bearing may be suspended from a support. The two sections $b$ and $b'$ of the bearing are joined to each other by bolts $d$, passed through annular flanges $e$ and $e'$, formed on the sections $b$ and $b'$ at their contiguous sides.

The section $b$ has a longitudinally-extending arm or tongue $f$, extending toward the section $b'$ and received within a longitudinally-elongated groove $g$ within said section $b'$. The arm $f$ and the groove wherein said arm is held allow the sections $b$ and $b'$ free movement toward and from each other, but prevent the sections from turning independently. When the bearing is held by the bracket or arm $c$, the purpose of the arm $f$ is then to prevent the section $b'$ of the bearing from turning.

By means of this construction the shaft $a$ is allowed to turn freely in the bearing, but owing to the formation of the frusto-conical parts $a'$ and $a^2$ and the bearing-sections $b$ and $b'$ the shaft cannot slide longitudinally and thereby be displaced.

In this application I make no claim to the construction claimed in my pending application, filed May 26, 1896, Serial No. 593,172. My present claims are limited to a bearing for continuous shafts, each section of which therefore has a passage entirely through it, so that the shaft may run in the passages.

Having thus described the invention, I claim—

1. The combination of a rotary shaft having a double frusto-conical part, the bases of which are coincident, and a bearing having two connected sections each with a tapering bore respectively receiving the frusto-conical sections of the shaft, the bores extending completely through each section and the shaft entirely filling said bores and projecting beyond the respective sections whereby the shaft may turn freely within the bearing and is prevented from longitudinal movement independently of the bearing, one section of the bearing having a longitudinally-extending arm and the other section of the bearing having a similarly-disposed groove receiving the arm whereby the sections of the bearing may be adjusted toward and from each other, and whereby also said sections are prevented from independent rotary movement, substantially as described.

2. A bearing having two connected sections, each with a tapering bore respectively extending entirely through the sections so that a shaft may project through each bore and beyond the respective sections, one section of the bearing having a longitudinally-extending arm and the other section of the bearing having a similarly-disposed groove receiving the arm whereby the sections of the bearing may be adjusted toward and from each other, and also whereby said sections are prevented from independent rotary movement, the bearing-sections having means by which they may be held in connection with each other, substantially as described.

JOSEPH HIMES.

Witnesses:
EDWARD H. LINCOLN,
J. C. LINCOLN.